(12) United States Patent
Rytilä et al.

(10) Patent No.: US 8,948,348 B2
(45) Date of Patent: Feb. 3, 2015

(54) METHOD FOR TESTING ELEVATOR EMERGENCY PHONES AND ELEVATOR EMERGENCY COMMUNICATION SYSTEM

(71) Applicant: Kone Corporation, Helsinki (FI)

(72) Inventors: Hannu Rytilä, Hyvinkää (FI);
Juha-Pekka Hienonen, Espoo (FI);
Tommi Huotari, Riihimäki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/916,831

(22) Filed: Jun. 13, 2013

(65) Prior Publication Data

US 2013/0272506 A1    Oct. 17, 2013

Related U.S. Application Data

(63) Continuation of application No. PCT/EP2010/069660, filed on Dec. 14, 2010.

(51) Int. Cl.
| | |
|---|---|
| *H04M 11/04* | (2006.01) |
| *H04M 3/30* | (2006.01) |
| *B66B 5/00* | (2006.01) |
| *H04W 4/22* | (2009.01) |
| *H04W 76/00* | (2009.01) |
| *B66B 19/00* | (2006.01) |

(52) U.S. Cl.
CPC ............... *H04M 3/30* (2013.01); *B66B 5/0093* (2013.01); *H04W 4/22* (2013.01); *H04W 76/007* (2013.01); *B66B 19/007* (2013.01)
USPC .................. 379/40; 379/27.02; 455/404.1

(58) Field of Classification Search
USPC .............. 379/26.02, 27.01, 27.02, 37, 40; 455/404.1, 404.2
See application file for complete search history.

(56) References Cited

U.S. PATENT DOCUMENTS

| | | | | |
|---|---|---|---|---|
| 5,016,269 | A * | 5/1991 | Rogers | 379/40 |
| 5,736,694 | A * | 4/1998 | Ketoviita | 187/391 |
| 2003/0227540 | A1 | 12/2003 | Monroe | |
| 2007/0090943 | A1 | 4/2007 | Tomek | |
| 2009/0016517 | A1 | 1/2009 | Emmanuel | |
| 2009/0252302 | A1* | 10/2009 | Monroe | 379/37 |
| 2011/0150190 | A1* | 6/2011 | Stauffer et al. | 379/37 |
| 2011/0284330 | A1* | 11/2011 | Massameno | 187/391 |

* cited by examiner

*Primary Examiner* — Quoc D Tran
(74) *Attorney, Agent, or Firm* — Birch, Stewart, Kolasch & Birch, LLP

(57) ABSTRACT

A method is provided for testing an elevator emergency phone, which emergency phone is either VoIP compliant and connected to a WAN or is connected with a mobile connection module for operation in a mobile network. In the method, the phone is periodically initiated to be registered in the corresponding communication network. The registration attempt is monitored by a reporting device. The status data of the registration attempt is communicated by the reporting device to a monitoring center, which itself is connected to the communication network, which monitoring center takes necessary action when either a registration attempt is not being executed within a set time period or if the result of at least one registration attempt has been communicated as failed.

16 Claims, 2 Drawing Sheets

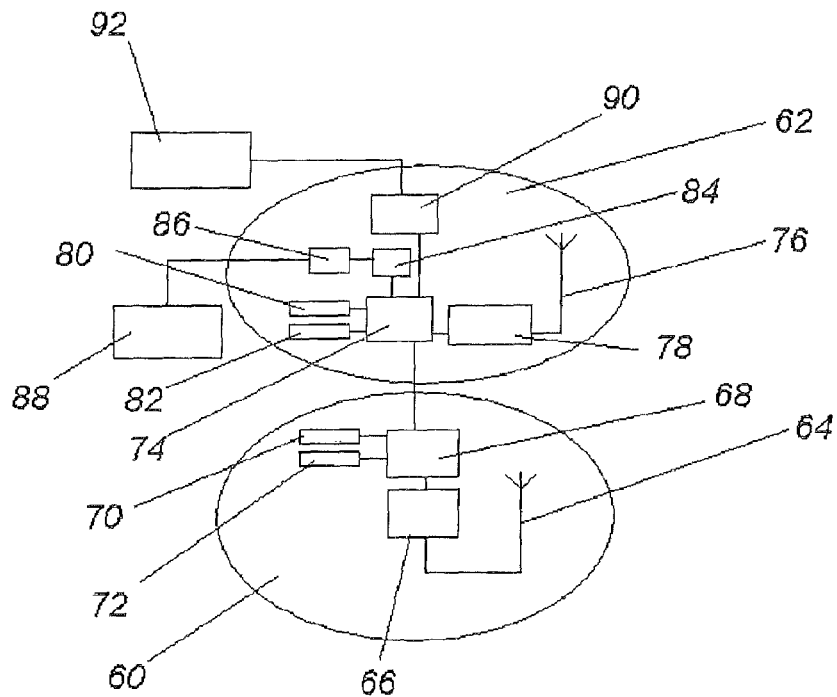
Fig. 2
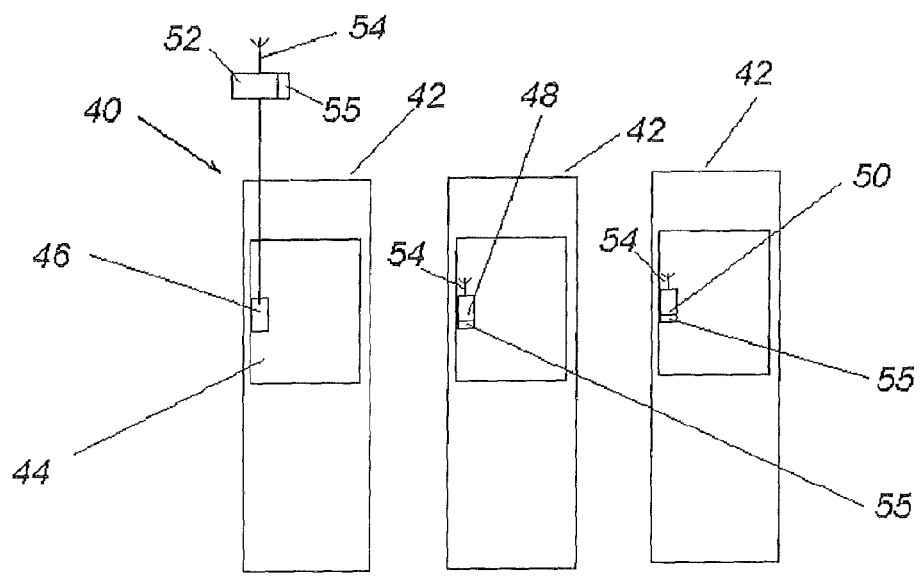

METHOD FOR TESTING ELEVATOR EMERGENCY PHONES AND ELEVATOR EMERGENCY COMMUNICATION SYSTEM

CROSS REFERENCE TO RELATED APPLICATIONS

This application is a Continuation of PCT International Application No. PCT/EP2010/069660 filed on Dec. 14, 2010, the entirety of which is hereby expressly incorporated by reference into the present application.

BACKGROUND OF THE DISCLOSURE

The current invention refers to elevator emergency phones which are provided most commonly in the elevator car of an elevator to allow persons trapped in the elevator car communicating with an emergency call centre 10 which takes the necessary steps to free the persons in the car. Currently, regular emergency phones are connected to a telephone communication network using circuit switched PSTN.

Particularly, for cost reasons it is to be expected that a large portion of these 15 emergency phones will be modernized to VoIP based phones or mobile phones. The costs for providing an emergency phone based on VoIP or via network is essentially lower than all the costs which are imposed with the installation and maintenance of a regular telephone network connection, particularly if elevator groups with several elevators are considered.

On the other hand elevator standards as EM81-1 require periodical testing of emergency phones.

SUMMARY OF THE INVENTION

The invention therefore aims for providing a method for testing elevator VoIP based or mobile emergency phones and an elevator emergency communication system which allows these emergency phones being tested with only a little effort and on the other hand ensures a reliable connectivity of the emergency phones.

This object is solved by the invention with a method according to claim 1 and with an elevator emergency communication system according to claim 6. Advantageous embodiments of the invention are subject matter of the corresponding sub-claims.

The present invention enables a reliable connectivity of a VoIP based or mobile phone in that the phone is periodically being registered in a corresponding communication network within a predetermined time period. A preferred time period is given in EN 81-1 which requires the testing of the functionality of the emergency phone at least every three days. Of course, this period may be shorter for example every day or may be altered to comply with particular requirements in a special case, e.g. weekly or monthly.

The corresponding communication network is regularly a WAN in case of a VoIP based emergency phone or a mobile communication network in case of a mobile phone.

A testing device is provided which initiates a registration process of the emergency phone in the corresponding network. This testing device can easily provided in connection with a building, e.g. in the LAN of a building or it can even be located in the emergency phone. In a very simple case the testing device may be realized by a software installed in one of the components of the emergency call system which initiates the registration of the emergency phone in the corresponding communication network.

After the initiation of a registration process by the testing device the registration attempt of the phone is monitored by a reporting device. The reporting device communicates status data of the registration attempt to the monitoring centre connected to the communication network, regularly in a service station of the elevator builder. The monitoring centre takes necessary action, e.g. immediate maintenance, when either registration attempt is not being executed within the predetermined time period or if the result of at least one registration attempt has been communicated as failed. By this means it is ensured that on one hand the registration tests are performed regularly, i.e. within the predetermined time intervals and on the other hand it is ensured that the registration attempts of the emergency phones within this testing period are successful, i.e. connectivity of the phones is ensured.

Basically, information communicated by the reporting device to the monitoring centre could comprise the status data of the registration attempt, as e.g. the date and time of the registration attempt and log information of the registration attempt and/or only the result of the registration attempt. In a preferred case it is sufficient that the reporting device only communicates the time of the registration attempt which signalizes to the monitoring centre that the registration attempt has been performed within the predetermined time interval and further it is sufficient that only unsuccessful registration attempts are communicated to the monitoring device as only the unsuccessful registration attempts necessitate any maintenance action to ensure the connectivity of the emergency phone. In this case preferably also the first successful registration process after a failed registration process is communicated to the monitoring centre, so that it is ensured that the connectivity is restored after maintenance action.

Often a building has several elevators and accordingly several emergency phones. In this case preferably also the ID of the corresponding emergency phone is communicated to the monitoring centre together with the status or log data of the registration attempt of that phone.

With these measures the invention ensures the connectivity of the emergency phone to the corresponding communication network.

The reporting device may also be located somewhere in connection with the building LAN or in the emergency phone. Also the reporting device may be implemented as a software program running in a any device connected with the building LAN or with modules located in the in the mobile emergency phone.

The reporting and testing device may also be located in one and the same program. Each device can be located at one definite point as a unit or can be distributed over several locations. E.g. a part of the testing device can be located in the monitoring center which only gives a triggering signal for the other parts of testing device located in connection with the emergency phones to initiate the registration process in the emergency phone upon receipt of the trigger signal. Thus the testing of emergency phones can be controlled by the monitoring center to be distributed over the time to avoid communication peaks upon simultaneous sending/receiving data regarding registration attempts.

Sometimes, it is further desired to ensure that the emergency phone is not only able to register in the communication network but is further able to get connected to the emergency call centre. On this behalf a test call function could be initiated by the testing device or the monitoring centre e.g. if no emergency calls have been issued from the phone over a predetermined time period. In this case an adapted time period would for example a period between a few days and a year. Anyway, according to specific requirements also other periods may be chosen. The testing device in this case not only initiates a registration into the communication network but also a test call which is registered by the reporting device as successful if connectivity to the emergency center is achieved, e.g. by receiving the call-connected signal. For safety purposes this call-connected signal obtained by the reporting device can be confirmed by a call signal of the emergency call center, which preferably gets the caller ID of the emergency phone. This confirmation can be handled later on by the monitoring center which compares the caller IDs of the emergency center with the data of the reporting device regarding a test call.

Preferably, the test call is interrupted by the testing device after receipt of the first call-connected signal. By this means it can be ensured that the emergency center is not loaded by test calls of the emergency phones.

The object of the invention is further solved by an elevator emergency communication system which comprises at least one elevator having an elevator car whereby in the car an emergency phone is located which may be used by passengers for connecting with an emergency call centre in case of accidents. The emergency phone is either a VoIP compliant phone or a mobile phone connectible to a mobile phone broadcast network.

The elevator emergency communication system further comprises a testing device to initiate the registration of the emergency phone in the corresponding communication network, which is regularly a WAN, e.g. Internet, in case of a VoIP based emergency phone or a mobile network, i.e. a home network or visiting network of a mobile communication network, in case of a mobile phone. The registration of the emergency phone is initiated by the testing device at predetermined time intervals, e.g. three days as required by EN 81-1. The testing device is simply a device for initiating the registration process which may be, as already mentioned above, in either location where it can initiate a registration process of the emergency phone. In a very simple embodiment the testing device can be realized by an arrangement in the emergency phone which starts a registration process upon receipt of a trigger signal, e.g. received from the monitoring centre or from any other device located in the communication network or in a local area network, e.g. from the reporting device.

The same holds true for the reporting device which can be located either in the emergency phone or in the local area network of the building where the elevator is located or in any connecting device to the communication network. The reporting device monitors the registration attempt of the emergency phone and sends status data of the registration attempt to the monitoring centre which is connected with the communication network. Regarding the status data of the registration attempt the same holds true as already discussed in connection with the inventive method.

If the emergency phone is a mobile phone preferably only a part of the complete registration process is monitored, i.e. the location update procedure wherein any VLR or HLR entity acknowledges the location of the mobile phone.

In case several elevators are located in an elevator bank only one the testing device and the reporting device is necessary for all emergency phones of the elevator group or for the complete building having several elevator groups. In this case the reporting device communicates desired the status or log data of the registration attempt and preferably also the ID of the emergency phone which has performed the registration attempt. With this measure the monitoring centre is immediately able to locate the exact position of the emergency phone in a group of elevators or in a larger building.

Of course, the elevator emergency communication system preferably comprises an emergency call centre which takes up emergency calls given from the emergency phone to initiate any rescue actions for trapped passengers.

If several emergency phones are located in a building and the emergency phones are VoIP based preferably these emergency phones are connected to a LAN of the building and the reporting device and preferably also the testing device is provided once for the plurality of emergency phones. Via this measure the effort for auxiliary devices of the emergency communication systems can be reduced to a minimum.

If the testing device and the reporting device of the elevator emergency communication systems are integrated particularly if used for a number of emergency phones in a building, the devices for the emergency communication system can be centralized and are therefore easy to maintain and to update or modernized.

Of course, VoIP based emergency phones as well as mobile emergency phones or PSTN compliant phones may be used in one and the same building or elevator group.

The invention is now being explained on behalf of two embodiments in connection with the corresponding drawings. Therein

BRIEF DESCRIPTION OF THE DRAWINGS

FIG. 2 shows a schematic drawing of an elevator emergency communication system with mobile phone emergency phones.

DETAILED DESCRIPTION

Figure 1:
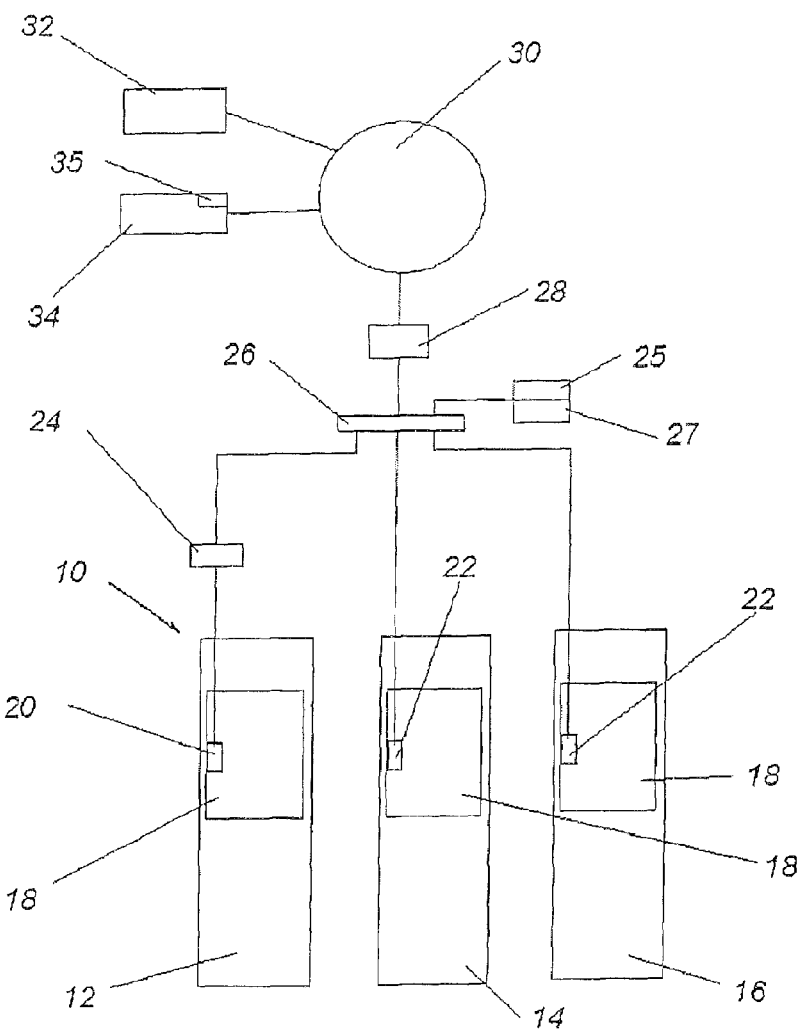
FIG. 1 shows an elevator emergency communication system with VoIP based emergency phones.

With reference to FIG. 1 reference numeral designates an elevator group with elevators 12, 14, 16 having an elevator shaft in which an elevator car 18 is moving up and down. In each car 18 an emergency phone is located as follows: In a first elevator 12 a PSTN based emergency phone 20 is located, whereas in the other elevators 14, 16 a VoIP based emergency phone 22 is located for enabling passengers to make emergency calls if entrapped in the elevator car in case of accidents. The PSTN based emergency phone 20 is connected via an adapter 24 to a building LAN network 26 to which the other VoIP based phones 22 are directly connected. The building LAN 26 is connected via a connecting device 28 to a wide area IP network (WAN) 30. Connected with the WAN is on one hand an emergency call centre 32 and a monitoring centre 34. The monitoring center 34 comprises a first part 35 of a testing device. The second part 25 of the testing device is connected with the building LAN 26, together with a reporting device 27. The reporting device 27 and the second part 25 of the testing device are here integrated but may be provided as separate units. The integrated unit of these devices 25, 27 is preferably located in the control panel of the elevator group control (not shown). The reporting device and/or the second part of the testing device may also be locate at other places, e.g. in the connection device 28. Particularly, the second parts of the testing devices may also be decentralized provided in each emergency phone 20, 22.

The second part 25 of the testing device for the VoIP based phones 22 in this emergency phone system works as follows:

In the monitoring centre 34, the first part 35 of the testing device sends a trigger signal into the WAN 30 which is received via the connection device 28 in the building LAN 26 and further in the second part 25 of the testing device. Upon the receipt of this trigger signal the second part 25 of the testing device initiates a registration process with each emergency phone 20,22 in the building. The second part of the testing device may provide a certain succession of the initiation of the registration processes for all phones to avoid loading of the LAN 26 and to separate the registration processes for each phone. In case of the PSTN based phone 20 the registration process may also be performed by the adapter 24.

This registration process performed by each emergency phone 20, 22 is monitored by the reporting device 27 for each phone 20, 22 and after the registration process is terminated the reporting device 27 informs the monitoring device 32 via the WAN 30 either about the time of the registration attempt and/or a result of the registration attempt. If, as in the present case several phones 20, 22 are connected to a building LAN 26 preferably also the identity of the emergency phone is sent by the reporting device to the monitoring center 34 in connection with the date and/or log data or result of the registration process.

Basically, it is sufficient that the reporting device only transmits the date of a successful registration attempt to the monitoring centre 34. Further it is obligatory for the reporting device 27 to send any failed registration attempt to the monitoring center 34 so that maintenance action on the emergency phone can be initiated by the monitoring centre immediately after a failed attempt. By this means it is possible for the monitoring centre to ensure the operate ability of the emergency phones. The date of a registration attempt may also be added by the monitoring center 34 in case the reporting device 27 sends the log data or the results of a registration attempt to the monitoring center 34 immediately or shortly after completion of the registration attempt. Of course, also positive results could be reported to the monitoring centre although this is basically not necessary.

In case of the PSTN based phone 20 either the phone 20 itself or the adapter 24 which connects the conventional PSTN based cable telephone 20 to the building LAN 26 must be able to start a registration process initiated by the second part 25 of the testing device and to report log data to the reporting device.

Furthermore, the system may have a capability to perform test calls to ensure not only the connectivity of the VoIP based phones to the WAN but also the connection to the emergency call centre 32. These test calls could also be initiated by any part 25, 35 of the testing device or by the emergency call center 32 or by the monitoring centre 34. The registration process is then continued until a call-connection signal is received by the phone 20, 22. After the receipt of this signal the connection process is cancelled to avoid a loading of the emergency call center 32.

In a second embodiment of the invention an elevator group 40 comprises elevators 42 having an elevator car 44 in which emergency phones 46, 48, 50 are located. One of the phones 46 is a PSTN based phone which is connected to a mobile network via a mobile gateway 52. The gateway 52 as well as the mobile emergency phones 48 and 50 comprise antennas 54 for the connection with the mobile network as well as integrated testing and reporting devices 55.

A mobile telephone broadcast network regularly comprises visiting networks 60 and a home network 62.

Each visiting network 60 comprises antennas 64 connected to a base station controller BSC 66 which is again connected to a mobile services switching centre MSC 68.

The MSC 68 of the visiting network is connected to a home location register HLR 70 as well as to a visitor location register VLR 72.

Further, the MSC 68 of the visiting network 60 is connected to the MSC 74 of a home network 62. The home network 62 itself comprises mobile communication section antennas 76 which are connected to a radio network controller RNC 78, which again is connected to the MSC 74 of the home network 62. Furthermore, the MSC 74 of the home network is connected to a HLR 80 and VLR 82 of the home network 62.

Furthermore, the MSC 74 of the home network 62 is connected via a serving GPRS support node (SGSN) 84 and a gateway GPRS support node (GGSN) 86 to a monitoring centre 88.

Further, the MSC 74 of the home network 62 is connected via a gateway MSC (GMSC) 90 to an emergency call centre 92. The GMSC is provided for the connection of the home mobile network 62 with a cable telephone network.

The testing procedure in this mobile telephone network based emergency phone system is as follows:

Generally, when a mobile phone is turned on it tries to register into a home network or, if not available, into a visiting network. The registration process includes several procedures from resource allocation to authentication. Anyway, the present invention only uses the location update procedure of the registration process which tells to the network and to the phone in which network and in which cell the mobile phone is connected to.

After a successful location update procedure the HLR entity knows in which network and in which location the mobile phone has entered and when it has updated its location. During the location update procedure the network gives a time for the mobile phone when it needs to renew its location by activating periodic location update procedures. The mobile phone will update its location after the required time even in case it remains in the same place.

In each of the mobile emergency phones 48, 50 as well as in the mobile gateway 52 a reporting device 55 is located which monitors the registration attempt, e.g. the location update procedure of the mobile phone to the monitoring centre 88. The reporting device can also be provided in the mobile network, particularly in the home network 62. The reporting device 55 can be implemented as software implemented reporting function.

With regard to the data to be transferred from the reporting device to the monitoring center 88 it is referred to the statements regarding the invention and the first embodiment.

In case of the PSTN based emergency phone 46 which is connected to the mobile gateway 52 the registration update procedure of the mobile gateway 52 is monitored. Here the reporting device can be located in the PSTN based phone 46, in the mobile gateway 52, in the monitoring centre 88 or in the home network 62.

A test call function can be provided by the monitoring center, e.g. if no alarm calls have reached the monitoring or emergency call center 92, 88 over a certain time period. The test call from the monitoring center can evaluate the call connectivity test being successful if the call-connected signal is obtained when calling a mobile emergency phone.

In both embodiments of the invention the emergency call center and the monitoring center may be integrated.

The invention claimed is:

1. A method for testing an elevator emergency phone, which emergency phone is either VoIP compliant and connected to a WAN or is connected with a mobile connection module for operation in a mobile network, said method comprising the steps of:
periodically initiating the phone to be registered in the corresponding communication network;
monitoring the registration attempt by a reporting device; and communicating status data of the registration attempt by the reporting device to a monitoring center, which itself is connected to the communication network, which monitoring center takes necessary action when either a registration attempt is not being executed within a set time period or the result of at least one registration attempt has been communicated as failed, wherein a test call function is initiated by the monitoring center when no emergency calls have been issued from the emergency phone over a predetermined time period to confirm functionality of the emergency phone.

2. The method according to claim 1, wherein the status data comprise the time and/or the success of a registration attempt.

3. The method according to claim 1, wherein only failed registration attempts and successful registration attempts following a failed registration attempt are communicated to the monitoring center.

4. The method according to claim 1, wherein the reporting device further communicates an ID of the corresponding emergency phone to the monitoring center.

5. An elevator emergency communication system, comprising:

at least one elevator, which elevator has at least one elevator car, which car has an emergency phone which can be used by passengers for connecting with an emergency call center in case of accidents, the emergency phone being VoIP compliant or a mobile phone, and which system further comprises a testing device to initiate the registration of the phone in a corresponding communication network at predetermined time intervals; and a reporting device which monitors the registration attempt and sends status data of the registration attempt to a monitoring center, connected with the communication network, wherein the monitoring center is configured to initiate a test call function by the monitoring center when no emergency calls have been issued from the emergency phone over a predetermined time period to confirm functionality of the emergency phone.

6. The elevator emergency communication system according to claim 5, wherein the emergency phone is a mobile phone and the registration attempt is a location update procedure.

7. The elevator emergency communication system according to claim 5, wherein the reporting device is configured to communicate further an ID of the emergency phone for which registration status data is communicated to the monitoring center.

8. The elevator emergency communication system according to claim 5, wherein the status data comprises the time of the execution of a registration attempt and/or the result of a registration attempt.

9. The elevator emergency communication system according to claim 5, wherein the reporting device is comprised in the emergency phone or comprised in/connected to a device between the emergency phone and the communication network.

10. The elevator emergency communication system according to claim 5, wherein a plurality of emergency phones which are located in a building having several elevators, which phones are connected to a building LAN and that one reporting device is provided for the plurality of emergency phones, which reporting device is connected to the building LAN.

11. The elevator emergency communication system according to claim 5, wherein at least a part of the testing device and the reporting device are integrated.

12. The elevator emergency communication system according to claim 5, wherein the testing device is located in the emergency phone.

13. The method according to claim 2, wherein only failed registration attempts and successful registration attempts following a failed registration attempt are communicated to the monitoring center.

14. The method according to claim 2, wherein the reporting device further communicates an ID of the corresponding emergency phone to the monitoring center.

15. The method according to claim 3, wherein the reporting device further communicates an ID of the corresponding emergency phone to the monitoring center.

16. The elevator emergency communication system according to claim 6, wherein the reporting device is configured to communicate further an ID of the emergency phone for which registration status data is communicated to the monitoring center.

* * * * *